3,343,940
PROCESS FOR PLANT DESICCATION

Ivan C. Popoff, Ambler, and Bernard Buchholz, Flourtown, Pa., assignors to Pennsalt Chemicals Corporation, Philadelphia, Pa., a corporation of Pennsylvania
No Drawing. Filed June 12, 1964, Ser. No. 374,844
13 Claims. (Cl. 71—74)

This invention relates to chemical compounds having particular use as plant desiccants. In particular, the invention is concerned with compounds having the structure

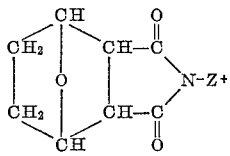

where $Z^+$ is the cation of a base stronger than ammonia.

The above compounds are active desiccants, and plants may be desiccated by applying to their foliage a desiccating amount of a carrier composition containing one or more of the above salts as the active agent. In general, the amount of active agent which will be used will be those rates of application to the plant between 0.05 and about 10.0 pounds per acre, although, of course, higher rates of application may be used and may be preferable for certain types of plants, particularly large woody plants such as trees.

It is to be understood that the term "desiccation" as used in this discussion is meant to include also defoliant activity, since the active agents of the invention function both to desiccate with and without foliar drop. When foliar drop occurs, defoliation is more descriptive of the action, but in any event, both desiccation and defoliation effects are achieved by this invention.

The defoliation of plants and crops is of high economic importance in both agricultural and forestry operations. Defoliation of plants is desirable to increase the value of the crops from such plants, either by hastening maturity of the crop and/or improving the grade of fruit. With cotton plants, defoliation at the proper stage in their life is desirable in order to expose the lower bolls which, in luxuriant plants, are inaccessible to the sunlight which is needed for the ripening process. Defoliation of the cotton plant also enables cotton picking to be made much more efficiently by hand or machine. Defoliation of citrus trees, peach, plum, apple and other fruit trees, as well as other types of trees, is also important in order to remove a certain number of leaves and thereby more or less force the maturity of the plant or its fruit. Likewise, vegetables such as string beans, soy beans and various crop plants are frequently subjected to defoliation in order to make harvesting easier. In like manner, desiccants are frequently used on seed crops to aid in harvesting.

The procedures that will be used to apply the active agents of this invention to trees, vegetables, plants and other crops for desiccation and defoliation purposes, will be in accord with the usual practices. The compounds of the invention generally have water solubility and will therefore be employed generally in aqueous solution. Where the compounds have limited water solubility, however, they may be employed either as a solution in an organic solvent, or they may be applied to the plant as an aqueous dispersion or emulsion. When an organic system is employed, the organic solvent will generally be of the ketone type, such as acetone, methyl ethyl ketone, cyclohexanone and the like, but other solvent systems may also be used, such as aliphatic amides (e.g. dimethylformamide, dimethylacetamide, etc.), ketoalcohols (e.g. diacetone alcohol), and the like. Aromatic hydrocarbons (e.g. xylene, toluene, etc.) are also useful solvents for many of the compounds of the invention.

The active agent of the invention may be made up as a concentrate which will be manufactured and sold as an article of commerce. Such a concentrate is simply diluted with water just prior to use to form the aqueous solution or dispersion for spraying of the foliage of the plant. A concentrate generally will contain from 5 to about 50% by weight of the agent, the balance being liquid vehicle and surfactant, if the liquid vehicle is non-aqueous such as a hydrocarbon oil. Alternatively, the active agent may be placed on a solid carrier rather than in a liquid carrier, as described above. Solid carriers may be applied directly to the plants by dusting, or they may be in the form of wettable or dispersible powders which likewise may be added to aqueous systems for application by conventional techniques. Concentration of the active agent on the carrier will vary between about 2 and 20% by weight of the total composition.

The active compounds of the invention are prepared from 3,6-endoxohexahydrophthalimide which is obtained by the action of aqueous ammonium hydroxide on 3,6-endoxohexahydrophthalic anhydride, in accordance with the disclosure of Yuriev and Zefirov, Zhur, Obsh. Khimii 29, 2954 (1959). The parent 3,6-endoxohexahydrophthalimide is inactive as a desiccant and in accordance with this invention, the active agents are its salts, it being understood that the active entity is the 3,6-endoxohexahydrophthalimide anion:

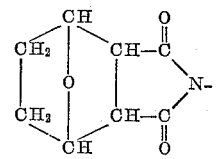

The cation $Z^+$ may be the cation of any base stronger than ammonia and will include the cations obtained from alkali metals (e.g. Li$^+$, K$^+$, Na$^+$, Cs$^+$, etc.), from tri-lower-alkyl sulfonium hydroxides or tri-lower-alkyl sulfonium halides (e.g. cations such as trimethyl-sulfonium, methyl-diethylsulfonium, etc.), from substituted ammonium bases such as quaternary ammonium hydroxides (e.g. cations such as tetramethylammonium, benzyltrimethylammonium, tetrabutylammonium, etc.), from tetraalkyl phosphophonium hydroxide, trialkylselenium hydroxide, tetraalkylarsenonium hydroxide, the corresponding halides, and the like. Specific structural examples of such cations will include the following:

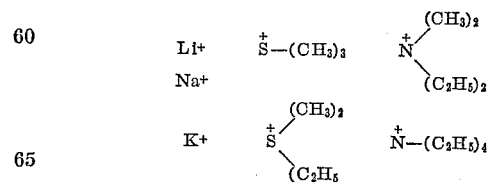

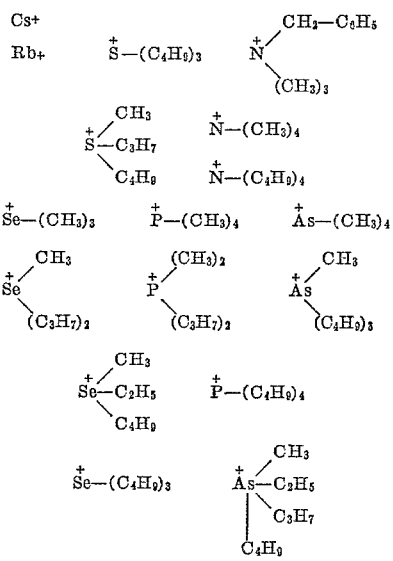

The alkali metal salts are prepared by reaction of the imide with alkali metal hydroxides (e.g. NaOH, KOH), or with an alkali metal alcoholate (e.g. sodium ethylate, potassium isopropylate, lithium ethylate, etc.) in the corresponding alcoholic solvent, or by the use of the appropriate sulfonium, ammonium, phosphonium, arsenonium, selenonium, and the like hydroxide or halide. The substituted tetraalkylammonium, the sulfonium, phosphonium, selenonium and arsenonium salts are novel compounds which are crystalline solids having sharp melting points in the pure state. These compounds are generally water soluble and also have solubility in polar solvents such as acetone, ethanol, and the like. The following examples will illustrate the preparation of the compounds:

*Example 1.—Sodium salt of 3,6-endoxohexahydrophthalimide*

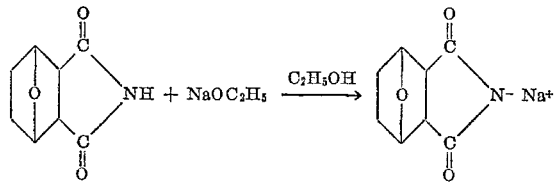

To 25 ml. of absolute ethanol there was added 1.1 g. (0.018 mole) of sodium and the reaction was allowed to proceed to completion. This solution of sodium ethoxide was then added gradually to 7.0 g. (0.042 mole) of 3,6-endoxohexahydrophthalimide dissolved in hot ethanol, whereupon the N-sodium imide precipitated out. The mixture was refluxed for 15 minutes, cooled, and filtered. The product was washed with more alcohol and dried under a vacuum overnight. 7.5 g. (95%) of product was obtained.

*Analysis.*—$C_8H_8NNaO_3$, Found: 6.98 N; Calculated: 7.40 N.

*Example 2.—Potassium salt of 3,6-endoxohexahydrophthalimide*

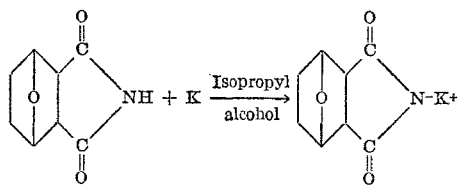

To 14 g. (0.084 mole) of 3,6-endoxohexahydrophthalimide dissolved in 500 mls. of isopropyl alcohol, 3.5 g. (0.089 mole) of potassium metal was added in small pieces. Precipitation of the solid product began after about one-half of the potassium had been added. The slurry was heated to reflux, filtered and cooled. The product, 3.5 g., was filtered and dried; it did not melt on heating to 250° C.

*Analysis.*—Found/Calc. % C, 45.6/46.8; % H, 5.4/3.9; % N, 6.6/6.8; % K, 18.4/19.0.

*Example 3.—Lithium salt of 3,6-endoxohexahydrophthalimide*

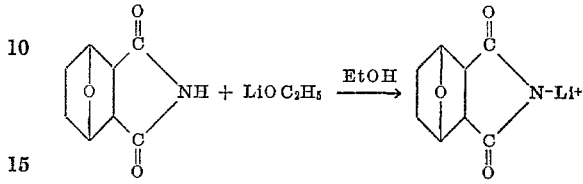

Lithium ethoxide was prepared by adding 0.7 g. (0.1 mole) of lithium to 50 mls. of absolute ethanol. Moderate heating to 60–65° C. was required to obtain reaction and a precipitate of lithium ethoxide formed. Then, 16.7 g. (0.1 mole) of 3,6-endoxohexahydrophthalimide was added with stirring. Additional ethanol and some acetone were added, the slurry heated to reflux, then cooled in an ice bath and filtered. In this way, 7.2 g. of product which did not melt up to 210° C. was obtained.

*Analysis.*—Found/Calc. % C, 51.20/55.50; % H, 5.03/4.63; % N, 7.80/8.10; % Li, 3.70/3.99.

*Example 4.—N-Trimethylsulfonium-3,6-endoxohexahydrophthalimide*

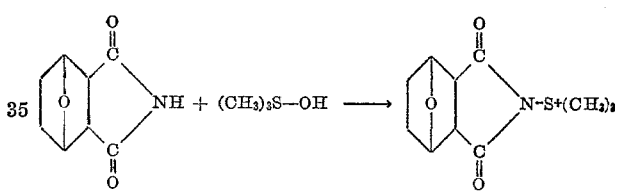

To a suspension of 16.7 g. (0.1 mole) of endoxohexahydrophthalimide cc. of ethanol was added 23.5 g. (0.1 mole) of 40% aqueous trimethylsulfonium hydroxide at room temperature. The reaction mixture was stirred at room temperature for 20 minutes becoming a clear solution. The ethanol was removed under reduced pressure, giving a solid residue, 18.5 g. (76.2%), melting at 83.5–88.5° C. Recrystallization from an acetone-chloroform mixture raised the melting point to 126°–126.5° C. The product is very soluble in water.

*Analysis.*—Found/Calc., % C, 54.04/54.45; % H, 7.25/7.04; % N, 6.02/5.76; % S, 13.25/13.20.

*Example 5.—N-tetramethylammonium-3,6-endoxohexahydrophthalimide*

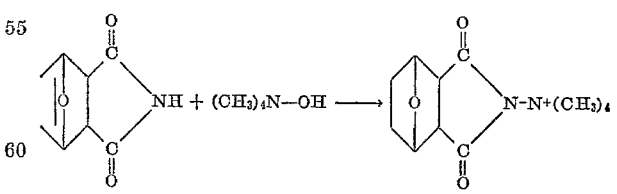

To a suspension of 8.4 g. (0.05 mole) of 3,6-endoxohexahydrophthalimide in 100 cc. of ethanol was added 50 g. (0.055 mole) of a 10% aqueous solution of tetramethylammonium hydroxide at room temperature. The reaction mixture was stirred at room temperature for 30 minutes and the solvent was stripped by distillation. The crystalline residue was triturated in acetone and vacuum dried at 25–40° C. for 20 hours to give 11.9 g. (99%) of the white crystalline product, M.P. 207–210° C. (dec.). The material is extremely hygroscopic, the C-H analysis indicating about 4.6% moisture content.

*Analysis.*—Found/Calc., % C 57.32/59.98; % H 8.60/8.39.

Example 6.—N-tetrabutylammonium-3,6-endoxohexahydrophthalimide

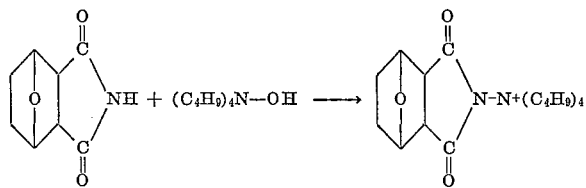

To a suspension of 5.0 g. (0.30 mole) of 3,6-endoxohexahydrophthalimide in 100 cc. of isopropanol was added 301 cc. (0.30 mole) of a 0.1 N solution of tetrabutylammonium hydroxide in isopropanol. The reaction mixture was stirred at room temperature for 20 minutes and the solvent was stripped by distillation. The crystalline residue was triturated in ether and vacuum dried at 40° C. for 6 hours, giving 6.8 g. (55.6%) of the white crystalline product; M.P. 90–97° C. The material was extremely hygroscopic.

*Analysis.*—Found/Calc., % N 6.89/6.85.

Example 7

Instead of using tetramethylammonium hydroxide in the above Example 5, tetramethylphosphonium hydroxide may be used to give the tetramethylphosphonium salt of 3,6-endoxohexahydrophthalimide, which compound is a white crystalline solid, soluble in water and recrystallizable from an acetone-chloroform mixture.

In like manner, tetramethylarsenium hydroxide and tributylselenium hydroxide may be substituted for the tetramethylammonium hydroxide of Example 5 to give the corresponding arsenium and selenium salts.

Evaluation of compounds

Desiccant activity was determined by spraying various formulations of the agents to Black Valentine bean plants at various rates of application and visually observing the effects. Table I which follows indicates the conditions used and the results obtained.

When the arsenomium, selenonium, and phosphonium salts are tested in accord with the above evaluation procedure, desiccant effects (both with and without foliar drop) are observed.

It will be understood that numerous variations and changes may be made from the above description and examples without departing from the spirit and scope of the invention.

We claim:

1. A process for desiccation of plants which comprises contacting the foliage of said plants with a phytotoxic amount of a compound having the structure

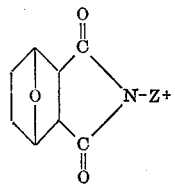

wherein Z is the cation of a base stronger than ammonia.

2. A process as in claim 1 wherein Z is an alkali metal.
3. A process as in claim 2 wherein the alkali metal is sodium.
4. A process as in claim 2 wherein the alkali metal is potassium.
5. A process as in claim 2 wherein the alkali metal is lithium.
6. A process as in claim 1 wherein Z is quaternary ammonium.
7. A process as in claim 6 wherein Z is tetramethylammonium.
8. A process as in claim 6 wherein Z is tetrabutylammonium.
9. A process as in claim 1 wherein Z is tri-lower alkyl sulfonium.
10. A process as in claim 9 wherein Z is trimethylsulfonium.
11. A process as in claim 1 wherein Z is tetra-lower alkyl phosphonium.
12. A process as in claim 1 wherein Z is tetra-lower alkyl arsenonium.

TABLE I.—DESICCATION EFFECTS OF 3,6-ENDOXOHEXAHYDROPHTHALIMIDE SALTS ON BLACK VALENTINE BEAN PLANTS

| Compound Tested | Formulation Used (Percent by Weight) | Desiccant Activity | |
|---|---|---|---|
| | | Defoliation | Desiccation |
| Z=Na | 2% aqueous solution | 50% in 3 days at 1 lb./acre | 100% in 1 day at 10 lb./acre. |
| Z=K | do | 50% in 4 days at 1 lb./acre; 67.5% in 14 days at 1 lb./acre. | Do. |
| Z=Li | do | 50% in 7 days at 10 lbs./acre | 10% in 4 days at 10 lbs./acre. |
| Z=S—(CH₃)₃ | do | 100% in 4 days at 1 lb./acre | 100% in 1 day at 10 lbs./acre. |
| Z=N(CH₃)₄ | do | 25% in 21 days at 0.1 lb./acre; 50% in 21 days at 1.0 lb.; 100% in 14 days at 10 lbs. | |
| Z=N(CH₃)₄ | 2% dispersion in oil | 50% in 21 days at 0.1 lb./acre; 100% in 21 days at 1.0 lb.; 100% in 4 days at 10 lb. | |
| Z=N(C₄H₉)₄ | 2% aqueous solution | 25% in 21 days at 0.1 lb./acre; 100% in 14 days at 1.0 lb./acre; 100% in 14 days at 10.0 lb./acre. | |
| Z=N(C₄H₉)₄ | 2% dispersion in oil | 12.5% in 14 days at 0.1 lb./acre; 75% in 14 days at 1.0 lb./acre; 100% in 14 days at 10.0 lb./acre. | 75% in 4 days at 10 lb./acre. |

13. A process as in claim 1 wherein Z is tri-lower alkyl selenonium.

References Cited

UNITED STATES PATENTS

| 2,576,081 | 11/1951 | Tischler | 71—2.5 |
| 2,781,360 | 2/1957 | Kleiman | 260—326 |
| 2,784,199 | 3/1957 | Grogan et al. | 260—326 |
| 3,018,175 | 1/1962 | Cameron | 71—2.5 |
| 3,020,143 | 2/1962 | Bluestone | 71—2.5 |
| 3,122,560 | 2/1964 | Rigterink | 71—2.5 X |

LEWIS GOTTS, *Primary Examiner.*

JULIAN S. LEVITT, JAMES O. THOMAS, Jr.,
*Examiners.*